March 16, 1954 E. J. BROWN 2,672,203
AUTOMATIC ROLL PREVENTER FOR SELF-PROPELLED VEHICLES
Filed Dec. 30, 1949 3 Sheets-Sheet 3
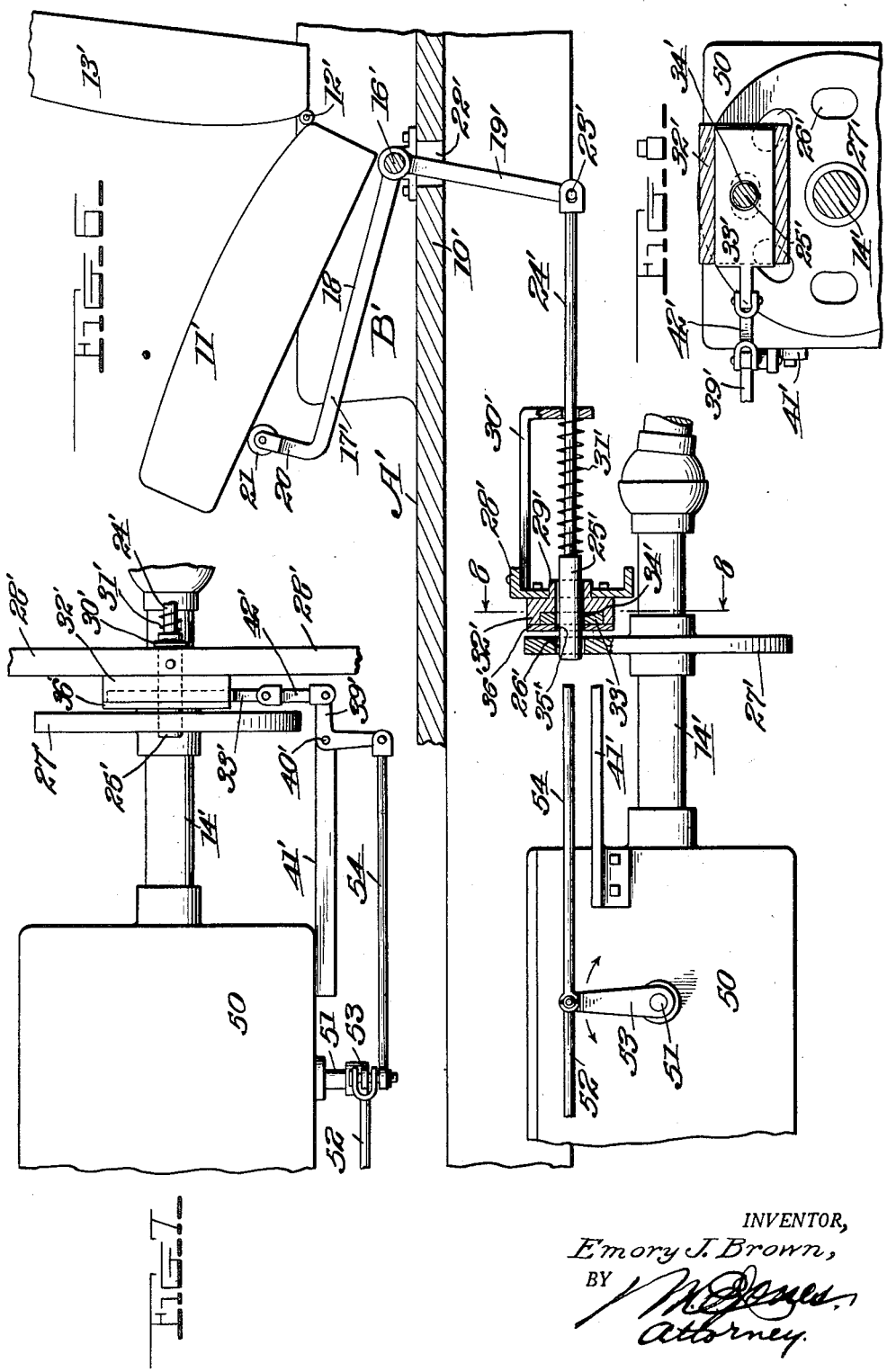
INVENTOR,
Emory J. Brown,
BY
Attorney.

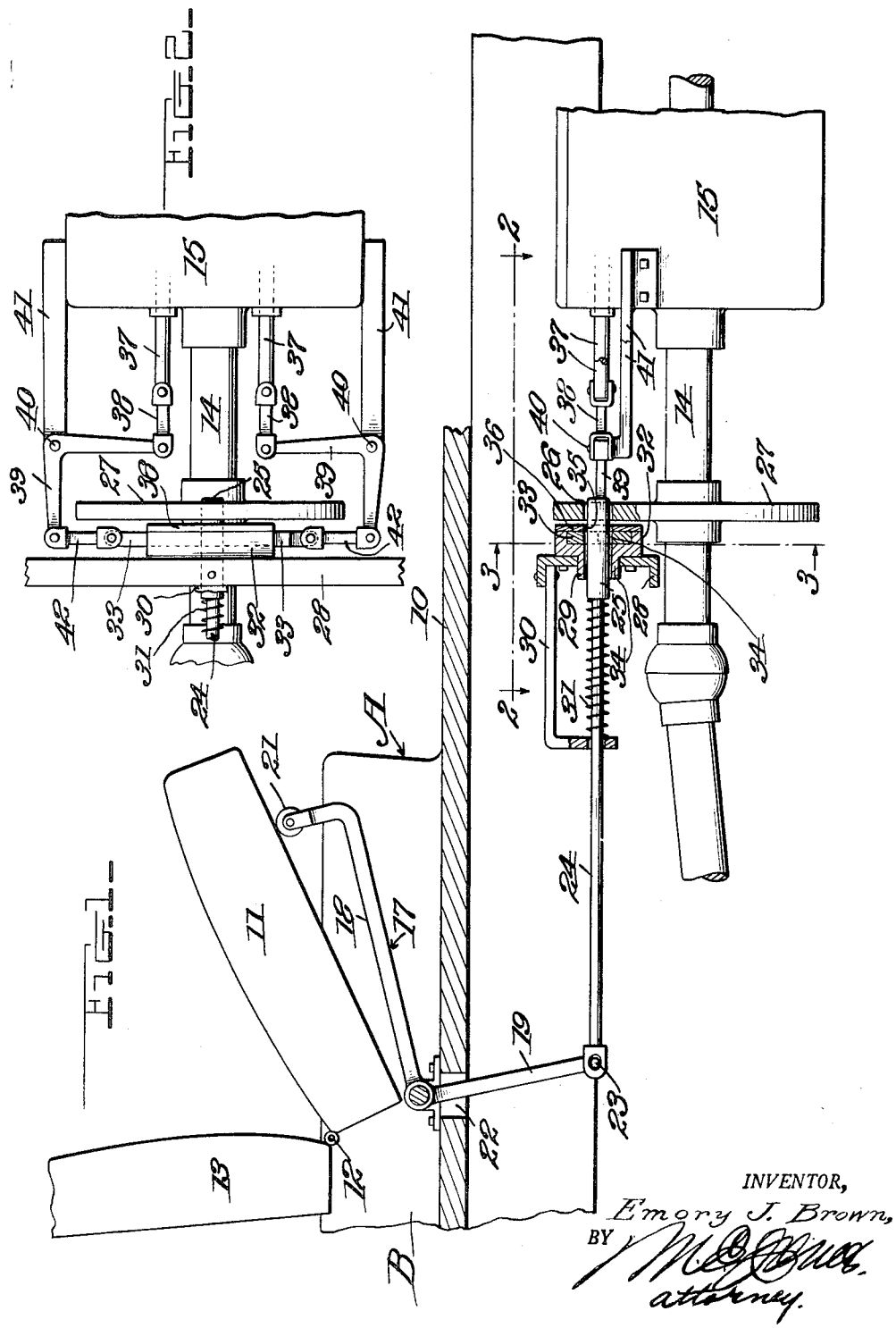

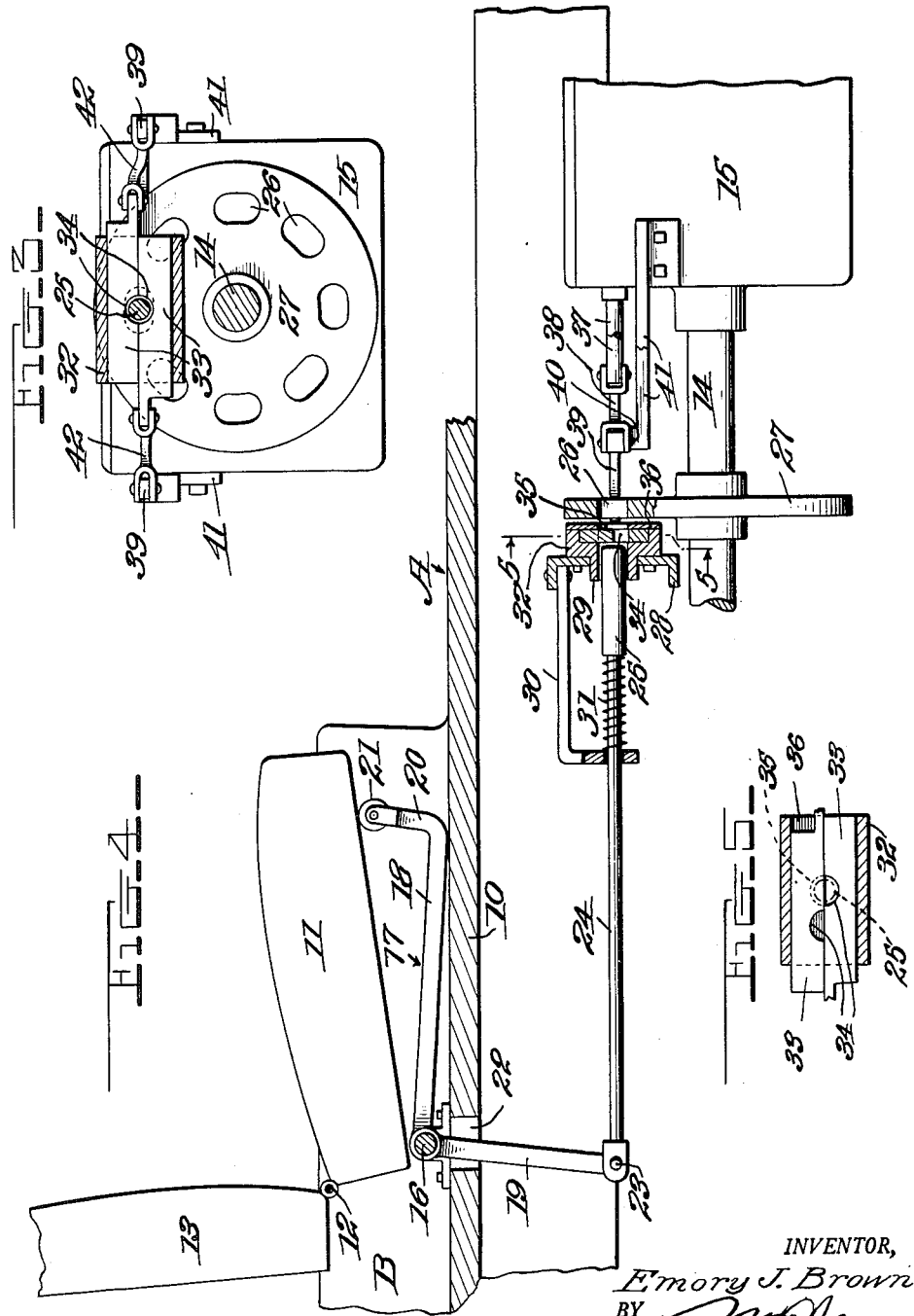

Patented Mar. 16, 1954

2,672,203

UNITED STATES PATENT OFFICE 2,672,203

AUTOMATIC ROLL PREVENTER FOR SELF-PROPELLED VEHICLES

Emory Jones Brown, Towson, Md.

Application December 30, 1949, Serial No. 136,012

5 Claims. (Cl. 180—82)

This invention relates to a safety appliance adapted to prevent or automatically arrest hillside rolling or gravitating motion of a parked motor vehicle, especially when the brake mechanism thereof has not been fully applied or is faulty, with a view to avoiding the damage to life and property so frequently resulting from the hazard mentioned.

One important object is to provide such an appliance to actuate under the control of the driver's seat so as to be applied only when the driver's seat is vacant.

Another object is to provide such an apparatus which depends upon the coaction of a movable part with an element which rotates through the rolling or gravitational travel of the motor vehicle.

Still another important object is to provide such a mechanism with novel coacting means which will preclude the application except in the neutral position of the transmission mechanism.

Further, it is aimed to provide a construction wherein a lever normally contacting an occupied hinged driver's seat retracts a slidable bolt or rod which is biased through the occupancy of the seat to swing the lever to raise the seat and slide the bolt or rod into motion-arresting engagement with a rotating part of the engine drive shaft or equivalent.

Still further the invention provides structure capable of much variation and modification so as to be adapted in different specific forms for use in practically all types of self-propelled vehicles, trucks as well as passenger cars, whether or not the transmission is hand-lever operated, hydramatic, fluid or otherwise.

Various additional objects and advantages will in part be pointed out and otherwise become apparent as the description proceeds in connection with the accompanying drawings illustrating one operative embodiment by way of example.

In said drawings:

Fig. 1 is a view partly in vertical longitudinal section and partly in elevation taken longitudinally through a motor vehicle equipped with my invention which is in applied position preventing rolling of such vehicle;

Fig. 2 is a fragmentary plan view viewed from the plane of line 2—2 of Fig. 1;

Fig. 3 is a transverse sectional view taken on the plane of line 3—3 of Fig. 1;

Fig. 4 is a view of the parts of Fig. 1 but showing the parts constituting my improvement in restricted position;

Fig. 5 is a fragmentary detailed sectional view taken on the plane of line 5—5 of Fig. 4;

Fig. 6 is a view generally similar to Fig. 1 but taken through a vehicle having a different means of transmission-operation;

Fig. 7 is a fragmentary plan view of parts of Fig. 6, and

Fig. 8 is a section taken on the plane of line 8—8 of Fig. 6.

Referring specifically to the drawings wherein like reference characters designate like or corresponding parts throughout the different views, and first to the form of Figs. 1 to 5, a self-propelled vehicle is fragmentarily suggested at A, of which B is the chassis or body carrying floor 10 and a driver's seat 11 above the same, pivoted or hinged at 12 to the body B adjacent the base of a back 13. Drive shaft 14 for the rear wheels (not shown) is located centrally and longitudinally beneath said floor 10 as usual operatively associated with transmission mechanism 15 and a prime mover (not shown).

Suitably fulcrumed on floor 10 as at 16, is a rocker 17 in the form of a bellcrank lever having arms 18 and 19. Said arm 18 has a bend or projection 20 at its free end which is constantly in contact with the bottom of seat 11, and in order to minimize friction, such free end may have a roller 21 thereon. Floor 10 has an opening 22 through which the arm 19 depends. At 23, said arm 19 is loosely pivoted to a rod or bolt 24 adapted at an enlarged end 25 to automatically slide into an adjacent recess or opening of a series 26 of a disk or equivalent 27 which rotates with drive-shaft 14 should the vehicle, with seat 11 unoccupied, roll or gravitationally travel.

A cross beam 28 is attached to chassis B having an opening mounting a bearing 29 in which enlargement 25 is slidably disposed. Bolt 24 also is slidably guided through a bracket 30 and an expansive coil spring 31 surrounds bolt 24 and at opposite ends abuts the enlargement 25 and the bracket 30. When seat 11 is occupied as in the position of Fig. 4, it is in lowered position supported by contact of arm 18 with floor 10 and the tension of spring 31 is insufficient to raise it. However, said spring 31 is of such tension that when seat 11 is unoccupied and an opening 26 is aligned therewith, it will project enlargement 25 with adjacent opening 26, thereby rocking lever 17 and elevating seat 11 to the position of Fig. 1.

It will be realized that when seat 11 is again occupied, it will be lowered and the lever 17 thereby rocked, which retracts bolt 24 from engagement with disk 27, that is from the position of Fig. 1 to the position of Fig. 4.

Means is preferably provided whereby bolt 24 can only be applied when the parts of the transmission 15 are in neutral position to avoid accidental application or projection toward or into an opening 26 especially when the drive-shaft 14 is in motion. This result may be accomplished automatically through the shifting of the gears of transmission 15, or manually and independently of such transmission or in other desired way. As shown, bearing 29 is part of a channelled guide structure 32 suitably fastened to beam 28 in order to slidably mount in its channel one or more interceptors in the form of rods 33. As shown, there are two of such interceptors 33 and they are slidable in opposite directions and each has a semi-circular notch 34 in its inner edge.

In neutral position of the transmission 15, the notches 34 will align or register and collectively provide a hole as in Fig. 3, which will afford clearance for application of the bolt 24 at head 25 therethrough, through a hole 35 in a cover plate 36 of guide structure 32, and into adjacent recess 26. In all positions of the transmission other than neutral, however, the notches 33 will disalign as suggested in Fig. 5, and one or both will intercept the path of movement of bolt 24 and thus prevent any accidental application or forward movement thereof.

It is conventional in the transmission of self-propelled vehicles to have control means such as slidable gear shifting rails or rods such as 37 and to the same or extensions thereof links 38 loosely connect bell-crank levers 39, pivoted at 40 to brackets 41 secured to the case of the transmission. Links 42 loosely connect the levers 39 to said interceptor rods 33. It will thus be apparent that when the gears of the transmission 15 are shifted to neutral position, rods 33 will move relatively and align or register notches 34 so that rod 24 may be applied, although in all other positions of the transmission gears one or both of the interceptor rods 33 will intercept its path of application.

To recapitulate, when the seat 11 is occupied, that is in the position of Fig. 4, all parts of the motor vehicle A will be free for normal operation. However, spring 31 will be under tension and when the vehicle is parked and the operator leaves the seat 11, with an opening 26 aligned with bolt head 25 such tension in spring 31 is sufficient to slide bolt rod 24, moving head 25 into such recess, rocking lever 17 and elevating seat 11 as in Fig. 1. When head 25 is thus engaged with disk 27, drive shaft 14 cannot turn and the rear or drive wheels of the vehicle cannot be turned, hence the vehicle cannot roll or gravitate. While an opening 26 may not align with head 25 upon parking, accidental rolling or pushing of the vehicle will impart motion of the rear or drive wheels of the vehicle which will only very slowly turn disk 27 a small fraction of a revolution before an opening 26 will align with head 25 and be engaged thereby under tension of said spring 31. When seat 11 is again occupied, the weight of the operator will lower the same to the position of Fig. 4, thereby retracting head 25 from engagement with disk 27, whereby all parts will again be in position and condition permitting normal operation of the vehicle.

Considering now the structure of Figs. 6 to 8, it shows the application of the invention to another type of self-propelled vehicle, specifically one whose transmission 50 is operated or controlled by a rockshaft 51 extending laterally beyond one side thereof. This modification emphasizes the fact that the invention is capable of much variation and modification so that its principles may be used in practically all types of automobiles, trucks, or other self-propelled vehicles, and regardless of whether the transmission is hand-lever operated, hydramatic, fluid or otherwise. Said transmission 50 for example represents the type used in 1940 "Buick" automobiles wherein the gears are shifted upon rocking said shaft 51 initiated by a hand-lever (not shown) operatively connected by linkage 52 to a crank 53 on said shaft 51. All parts of the previous form up to and including cross-beam 28 correspond in structure and operation and the reference characters for such corresponding parts have merely been primed.

The crossbeam 28', as in the first form, has an opening mounting a bearing here designated 29' in which the enlargement 25' is slidably disposed. Also, like the preceding form, bolt 24' is slidably guided through a bracket 30' and an expansive coil spring 31' surrounds bolt 24' and at opposite ends abuts the enlargement 25' and the bracket 30'.

Bolt 24' can only be applied when the parts of the transmission 50 are in neutral position to avoid accidental application or projection toward or into an opening 26' especially when the drive-shaft 14' is in motion. This result may be accomplished automatically through the shifting of the gears of transmission 50, or manually and independently of such transmission or in other desired way. As shown, bearing 29' is part of a channelled guide structure 32' suitably rigidly fastened to beam 28' in order to slidably mount in its channel one or more interceptors in the form of rods or plates 33'. One interceptor 33' will suffice in this form and it is slidable in opposite directions and has a cut-out or opening 34' therethrough. A cover plate 36' is provided on guide 32' which has an opening 35' in alignment with head 25'.

Interceptor 33' has a link 42' pivoted to a bell-crank 39' pivoted at 40' to a bracket 41' rigid on the casing of transmission 50. A link 54 is pivoted to said bell crank 39' and crank 53.

In all positions of the transmission 50 other than neutral, the hole or cut-out 34' will disalign with hole 35' as suggested by dotted lines in Fig. 8, and will intercept the path of movement of bolt 24 and thus prevent any accidental application or forward movement thereof.

It will thus be apparent that when the gears of the transmission 50 are shifted to neutral position, interceptor 33' will move and align or register holes 34' and 35' so that rod 24' may be applied, although in all other positions of the transmission gears the interceptor 33' will intercept its path of application.

Various changes may be resorted to, provided they fall within the spirit and scope of the invention.

What is claimed is:

1. In safety apparatus for a vehicle having a driving means including a selective gear transmission mechanism capable of motion imparted through rolling of the vehicle, a part partaking of said motion, a biased mechanism releasable through said motion to lock said part and means against continuation of said motion, and interceptor means operatively connected with and controlled by said transmission mechanism effective to limit operation of said biased mechanism in the neutral position only of said transmission.

2. In safety apparatus for a self-propelled vehicle, a seat mounted for movement when unoccupied, the vehicle having a drive mechanism movable through motion imparted by rolling of the vehicle when unoccupied, a part partaking of said motion, said drive mechanism including selective gearing, bolt means engageable with said part in a predetermined position of the latter upon said movement of said seat, actuating means for said bolt means biased through the return of said seat to position for occupancy, and interceptor means controlled by operation of said selective gearing effective to limit release of said biased actuating means and bolt to said predetermined position of said transmission.

3. In safety apparatus for a self-propelled vehicle, a seat mounted for movement when unoccupied, the vehicle having a drive mechanism movable through the motion imparted through rolling of the vehicle when unoccupied, said drive mechanism including selective gearing, bolt means engageable with said part in a predetermined position of the latter upon said movement of said seat, actuating means for said bolt means biased through the return of said seat to position for occupancy, and interceptor means controlled by operation of said selective gearing comprising slides movable across the path of movement of said bolt means effective to limit release of said biased actuating means and bolt to said predetermined position of said transmission, said slides having openings arranged to register to provide clearance for operation therethrough of said bolt means.

4. In safety apparatus for a self-propelled vehicle, a seat mounted for movement when unoccupied, the vehicle having a drive including a selective gear transmission mechanism and a part movable through the motion imparted to said drive by rolling of the vehicle, a bolt engageable with said part, means operatively guiding said bolt including a guide bracket for the latter, a lever operatively connected to said bolt and controlled by said seat, a biasing spring associated with the bolt and said bracket tensioned through the movement of said seat into the occupied position, said first mentioned means including interceptors movable with the selective gear transmission mechanism to constrain operation of the bolt to the neutral position of the transmission.

5. In safety apparatus for a self-propelled vehicle, a seat mounted for movement when unoccupied, the vehicle having a drive including a selective gear transmission mechanism and a part movable through the motion imparted to said drive by rolling of the vehicle, a bolt engageable with said part, means operatively guiding said bolt including a guide bracket for the latter, a lever operatively connected to said bolt and controlled by said seat, a biasing spring associated with the bolt and said bracket tensioned through the movement of said seat into the occupied position, interceptors slidably mounted by said means constraining operation of said bolt to the neutral position of the transmission, and means to actuate said interceptors through operation of the selective gear transmission.

EMORY JONES BROWN.

References Cited in the file of this patent

UNITED STATES PATENTS

| Number | Name | Date |
|---|---|---|
| 1,090,011 | Ballinger | Mar. 10, 1914 |
| 1,158,891 | Braun | Nov. 2, 1915 |
| 1,346,949 | Gibson et al. | July 20, 1920 |
| 1,582,879 | Midboe | Apr. 27, 1926 |
| 1,708,009 | Burger | Apr. 9, 1929 |
| 1,844,818 | Gattie | Feb. 9, 1932 |
| 1,909,377 | Neveu | May 16, 1933 |
| 2,250,754 | Dooley | July 29, 1941 |
| 2,377,303 | Acton | June 5, 1945 |

FOREIGN PATENTS

| Number | Country | Date |
|---|---|---|
| 40,923 | France | Sept. 16, 1932 |